Figure 1:
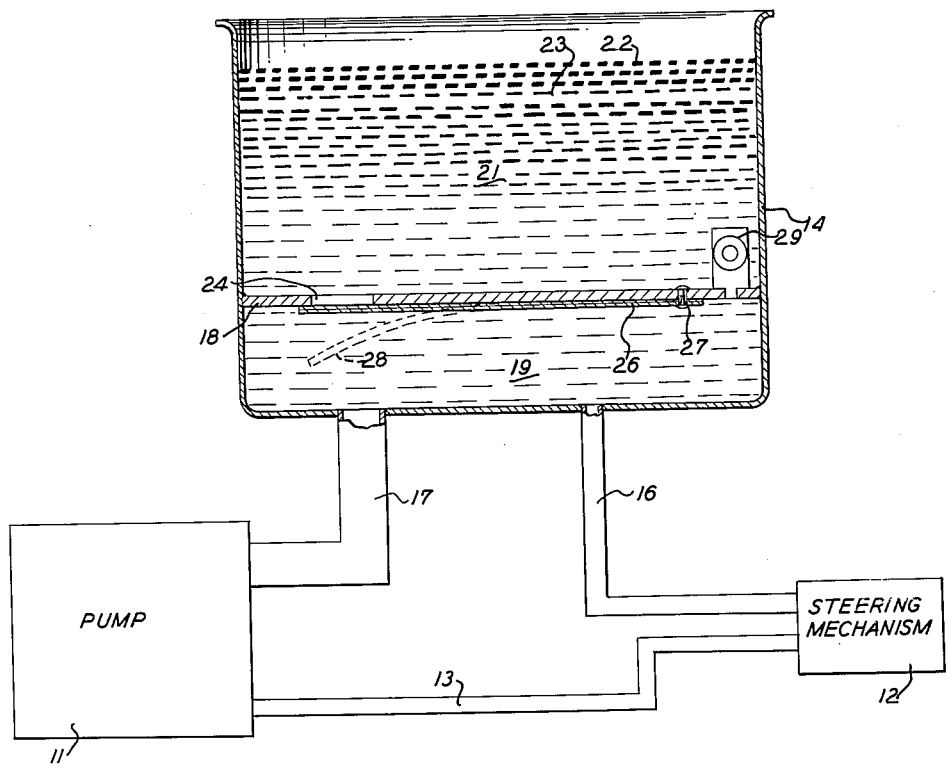

March 21, 1961  H. A. KUYPERS ET AL  2,975,801
PUMP FLOW CONTROL MEANS
Filed June 9, 1958

H.A. KUYPERS
A.S. MacLENNAN
F.R. DINGER
INVENTORS

BY E.C. McRae
J.R. Faulkner
J.H. Oster

ATTORNEYS

`2,975,801`
Patented Mar. 21, 1961

2,975,801

PUMP FLOW CONTROL MEANS

Harold A. Kuypers, Dearborn, Alastair S. MacLennan, Huntington Woods, and Frederick R. Dinger, Dearborn, Mich., assignors to Ford Motor Company, Dearborn, Mich., a corporation of Delaware Filed June 9, 1958, Ser. No. 740,897

4 Claims. (Cl. 137—576)

This invention relates generally to pump flow control means and more particularly to a flow control temperature responsive valve for use in providing a pressure head of liquid for the pump at low liquid temperatures.

One of the principal objects therefore is to provide means by which a pressure head of liquid is obtained for a pump operating at low liquid temperatures.

Another object of this invention is to provide valve means in the pump sump which at lower temperatures converts an open liquid system into a closed liquid system.

Still another object is to provide a temperature responsive control valve in a liquid pump sump which converts an open liquid system into a closed liquid system at low temperatures and which in response to rising liquid temperatures progressively alters the system to a fully open system at a predetermined high fluid temperature.

Although this invention is capable of practice in a variety of liquid pump applications, for illustrative purposes it will be described as it is used in oil pump system of a power steering system.

Prior to this invention, initial pump operation at low temperatures was noisy because of the lack of a pressure head on the pump due to the high viscosity of the oil. Air was sucked into the system through the sump and pump seals causing the pump to cavitate. This noisy pump operation continued until a sufficient amount of oil had been heated to provide a full flow to the inlet side of the pump.

In the applicants' construction the sump is divided by a separator into an upper and lower chamber. The lower chamber communicates with both the inlet side of the pump and the return side of the system. The chambers communicate with each other through an opening in the separator. A temperature responsive valve is secured to the separator so that it fully controls the opening in the separator. When the oil has reached a predetermined low temperature, the temperature responsive valve fully covers the opening in the separator making the oil system into a closed system. When the pump is started, oil returned from the oil using device enters the lower chamber under pressure. This pressurized slug of oil moves a like amount of lower chamber oil into the inlet line and into the pump to provide the necessary pressure head for the pump This operation continues and as the oil begins to warm up, the temperature responsive valve starts to gradually open the hole in the separator. As the pump continues to operate, the oil gradually warms up which results in the upper chamber oil warming up both through conduction and mixture as the temperature responsive valve opens the separator hole. Entrapped air can escape through the separator opening into the upper surface chamber and subsequently into the atmosphere.

Figure 2:
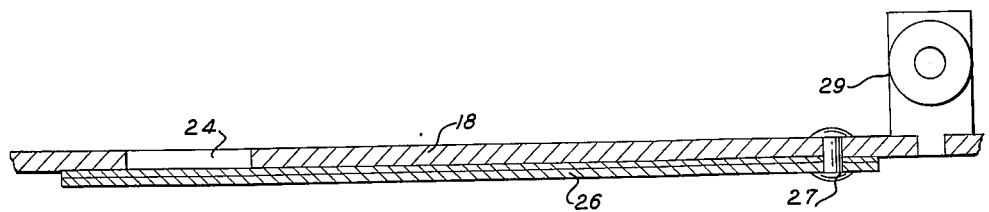

Other objects and advantages of this invention will be made more apparent as this description proceeds, particularly when considered in connection with the accompanying drawings, wherein:

Figure 1 is a schematic view semi-diagrammatic in part and cut away in part in which a power steering system is shown embodying the invention of the applicants; and, Figure 2 is an enlarged fragmentary view partly in section of the sump separator and showing the installation of the temperature responsive valve and the pressure responsive valves of Figure 1.

Referring now to the drawings and in particular Figure 1, the power steering arrangement has an engine operated pump 11. Pump 11 provides a viscous liquid usually oil 23, to a steering mechanism indicated generally at 12 which comprises the valve and other elements well known to the art through pressure line 13. From the steering mechanism, the viscous liquid is returned to the sump 14 through a reservoir inlet line 16 located in the bottom of the reservoir 14. Oil for the pump is supplied from the sump through conduit 17 which comprises the pump inlet line.

Referring now in particular to the sump 14, the sump is provided with a separator 18 which separates the sump into two oil chambers indicated at 19 and 21. The oil level normally maintained in the sump is indicated at 22 and, as can be seen, the oil 23 extends substantially above the separator 18. Separator 18 is provided with a passage 24 which communicates with the chambers 19 and 21. The chambers 19 and 21 differ considerably in size, in that chamber 19 is much smaller and that it is open to both the inlet line 16 and the pump inlet line 17. Chamber 21 is open to atmosphere through a vent in the cover (not shown).

A temperature responsive element 26 is shown secured by rivet 27 to the underside of the separator 18 and is so placed that it will control the passage 24 from within the chamber 19. In Figure 1 the element 26 is shown in a closed position of the aperture 24 as would be normally the case when the oil has reached a predetermined low temperature. Upon the heating of the oil, element 26 would gradually move to the change positions and fully open position indicated by the dashed lines 28 thereby opening the passage 24 so that the oil in compartments 19 and 21 mix with each other. Although the temperature responsive element 26 is illustrated as a bi-metal leaf spring, it is obvious that any one of many available temperature responsive elements may be used. These elements may be attached in any known manner, i.e., in the passage 24, to the separator 18 or to the walls of the sump in either chamber 19 or 21.

In actual operation, therefore, the element 26 will have covered the aperture 24 if the oil temperature is low enough. Upon starting the pump, return oil coming out of the steering mechanism through the sump inlet line 16 will enter the chamber 19 under pressure forcing a pressure head of the heavy viscous oil to enter the pump inlet line 17. As the oil warms up, the element 26 opens accordingly to permit the warm oil in chamber 19 to mix with the cooler oil in chamber 19 and further let any air escape that might have been entrapped in the system.

It is possible when the oil system is a closed circuit that excessive pressures may result. To avoid damage to the system, an oil pressure relief valve 29 is provided in the separator 18 to vent the chamber 19 to chamber 21 when the closed system pressure has reached the setting of the valve.

This simple contruction permits a fluid pump to operate at all times with a pressure head of liquid regardless of the liquid temperature or viscosity. By the use of this simple device, pump cavitation noise and air intake is eliminated resulting in a quiet and efficient pump.

It will be understood that the invention is not to be limited to the exact construction shown and described, but that various changes and modifications may be made without departing from the spirit and scope of the invention, as defined in the appended claims.

What is claimed is:

1. Means for changing an open liquid system to a closed liquid system in response to liquid temperature comprising a liquid filled sump having a separator secured therein which separates the sump into a first and second liquid chamber respectively, passage means through said separator normally permitting the passage of fluid from one of said chambers into the other of said chambers, said first chamber adapted to be connected to a sump inlet and further adapted to be connected to a sump outlet, said second chamber being adapted to be vented to atmosphere, temperature responsive means in said sump which closes the passage means between the first and second chambers at a predetermined low liquid temperature and changing the liquid system from an open system to a closed system, said liquid passing from the sump inlet to the sump first chamber and out of the first chamber through the sump outlet, and pressure operated valve means operable to vent said first chamber when the liquid pressure has reached a predetermined value.

2. The structure defined by claim 1 which is further characterized in that said temperature responsive means comprises a bi-metal leaf spring member, and means for securing said member to the sump in the first chamber.

3. The structure defined by claim 1 which is further characterized in that said temperature responsive means is secured to the sump in the first chamber.

4. The structure defined by claim 1 which is further characterized in that said pressure operated valve means comprises a relief valve, means for securing said valve to the separator to direct vented fluid from the first chamber into the second chamber.

References Cited in the file of this patent

UNITED STATES PATENTS

| | | |
|---|---|---|
| 1,888,225 | Hetherington | Nov. 22, 1932 |
| 1,905,284 | Heitger | Apr. 25, 1933 |
| 2,285,305 | Reid | June 2, 1942 |
| 2,588,778 | Tibeau | Mar. 11, 1952 |
| 2,780,280 | Allen | Feb. 5, 1957 |